United States Patent [19]

Philipp et al.

[11] Patent Number: 5,198,190
[45] Date of Patent: Mar. 30, 1993

[54] METHOD OF RECYCLING HAZARDOUS WASTE

[75] Inventors: Carl T. Philipp; Bobby H. Sims, both of Hot Springs, Ark.

[73] Assignee: Enviroscience, Inc., Little Rock, Ark.

[21] Appl. No.: 632,000

[22] Filed: Dec. 21, 1990

[51] Int. Cl.$^5$ ............................................. C22C 33/04
[52] U.S. Cl. .................................... 420/582; 75/586; 75/654; 75/958; 423/DIG. 18
[58] Field of Search ............... 75/313, 414, 586, 958, 75/654; 420/582; 423/DIG. 18

[56] References Cited

U.S. PATENT DOCUMENTS

| | | | |
|---|---|---|---|
| 4,381,938 | 5/1983 | Claflin | 75/458 |
| 4,495,054 | 1/1985 | Claflin | 75/958 |
| 4,529,446 | 7/1985 | Valenti | 75/319 |

Primary Examiner—Melvyn J. Andrews
Attorney, Agent, or Firm—Stephen D. Carver

[57] ABSTRACT

A method of recycling hazardous and non-hazardous industrial wastes to reclaim valuable metals, metal alloys, and metal oxides, and to produce mineral wool. Wastes including hazardous wastes of USEPA Series D, F, P, K, and U are pulverized and blended with liquids such as water or wastewater to produce a homogeneous mass. Calcium from calcium-stabilized wastes is used to enhance the quality of the mineral wool, lower the sulfur content, remove phosphorous, and raise pH to facilitate metal reduction. The mass is formed into briquettes and melted in a cupola or shaft furnace in the presence of carbon or aluminum to reduce metals. Other types of furnaces such as an electric arc furnace may be used to avoid the steps of forming and curing briquettes. Reduction is carried out at temperatures between 1660 and 3100 degrees Fahrenheit. Reducible metals are reduced and drawn off into molds. Substantial purity is obtained in the recovered reducible metals. Volatile metals are volatilized and reclaimed in the air pollution control system. Remaining slags comprising principally oxides of non-reducible metals are used to produce mineral wool. Exhausts, heavy solids, and unspun shot particles are recycled into the system to eliminate waste.

4 Claims, 1 Drawing Sheet

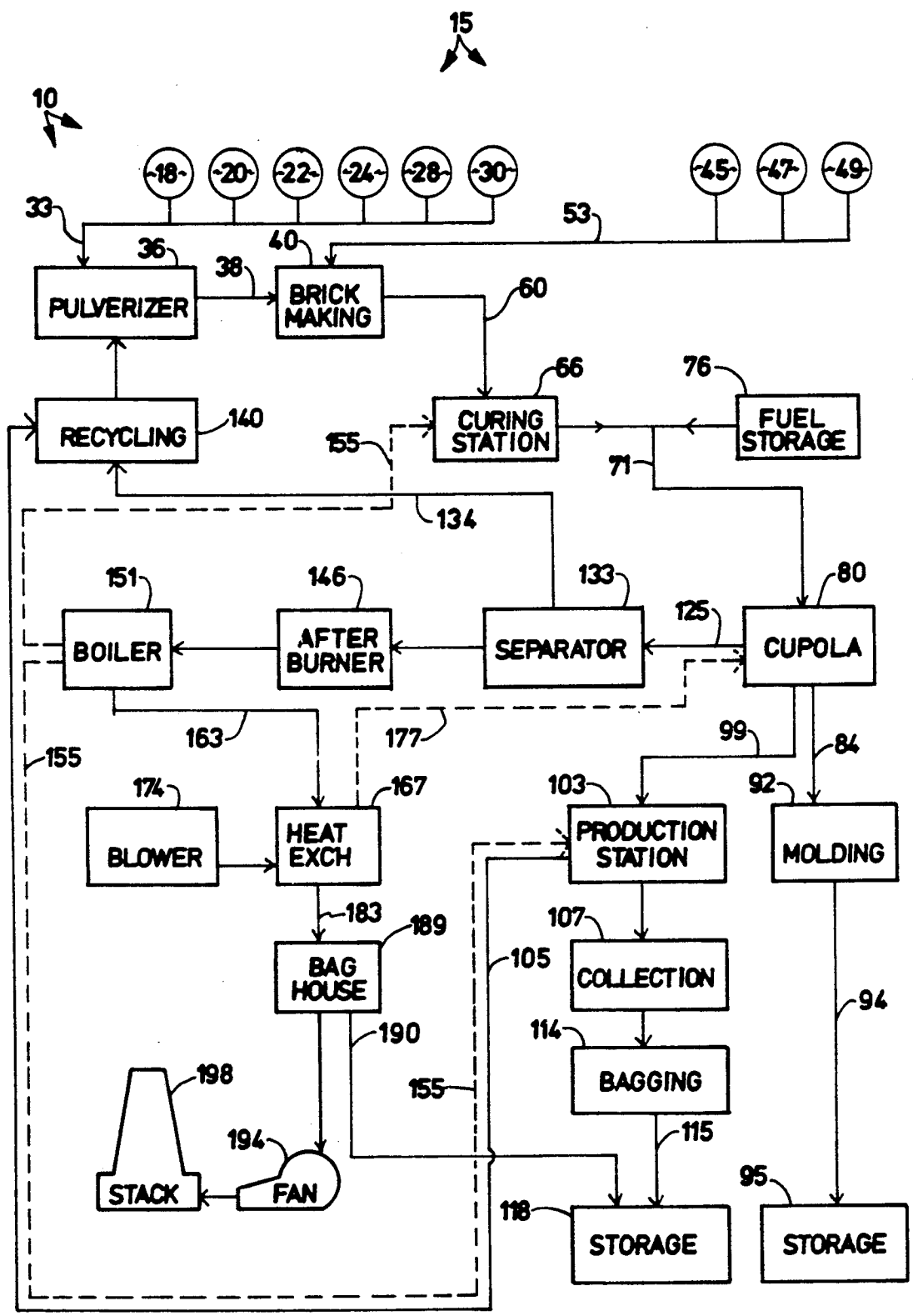

METHOD OF RECYCLING HAZARDOUS WASTE

BACKGROUND OF THE INVENTION

The present invention relates broadly to a waste recycling and metal recovery method. More particularly, the present invention relates to a method for recycling metal-bearing hazardous wastes to recover valuable metals and metal oxides. In the best mode, slags remaining after metal recovery are used to produce mineral wool, and no waste results.

Public awareness of problems associated with the rapid depletion of the earth's natural resources and disposal of industrial wastes has greatly increased in recent times. Such awareness, together with increased economic pressures, the tightening of competition, and government regulation of wastes have forced industrial concerns to take measures to minimize waste. In response, the focus of scientific undertaking in some industries has turned toward recovery and reuse of all commercially useful byproducts of industrial processes.

In the past, little attention was directed to the preservation of limited mineral resources. It was generally deemed more feasible to mine metal ores and to simply dump rich metal-bearing wastes than to salvage usable metals from waste products. This was particularly true in the case of industrial wastes which contained hazardous or toxic materials.

Hazardous industrial wastes were typically "stabilized" and/or captured in some generally non-leachable form with a basic material such as lime or cement. It is required to bury the stabilized materials in designated hazardous waste landfills. One widely accepted disposal method was to incorporate hazardous waste products into a glass-like matrix called slag which was used as a substitute for a natural rock aggregate in cement or asphalt used for paving roads and the like. However, the EPA has declared that no material which is considered hazardous can be applied to the land in any form, whether or not it has been diluted, treated, or otherwise "stabilized". Hence, the older disposal methods have fallen into disfavor. Alternative processes for treating wastes to produce environmentally "safe" products have been proposed.

For example, Frey U.S. Pat. No. 4,432,666 issued on Feb. 21, 1984 describes a process for storing and dumping hazardous wastes. Rostoker, U.S. Pat. No. 4,793,933 issued Dec. 27, 1988 teaches a method for treating metal hydroxide electroplating sludges by fusion of the oxides of the metals into a silica and sodium slag. The Rostoker method relates to earlier EP Leaching standards, and has been proven incapable of achieving minimal-waste recycling. Lynn, U.S. Pat. No. 4,840,671 issued Jun. 20, 1989, relates to the stabilization of EAF dusts for disposal. The latter '671 reference teaches the use of calcium hydroxides as an entrapping agent for toxic cadmium, chromium, and lead constituents. This patent suggests combining various different waste products to be processed to produce "safe" compounds.

However, in view of the general awareness of environmental and health risks, such treatment and disposal techniques are no longer deemed environmentally or economically sound. Moreover, because industry pays a relatively high premium for waste treatment and disposal, it is desirable to provide a commercially viable method for recovering as much usable material as possible. Such methods would be directed to reducing loss of profits and expanding commercial markets. Specifically, it is desired to provide a process which can be carried out with equipment and apparatus already available in the industry.

The United States Environmental Protection Agency (USEPA) has undertaken to classify certain materials for controlled disposal and/or recovery. The list of USEPA-listed hazardous wastes is presently limited, but will undoubtedly be enlarged with time. There are presently a large number of waste products generally recognized as unsafe for conventional disposal which have not yet come under USEPA scrutiny. For example, certain anodizing wastes such as F019 are presently listed but not classified as hazardous; sand used in blasting operations may be contaminated with nickel, chrome, or other metals which are considered toxic; and, baghouse dusts may contain carbon and hazardous materials have no separate classification under the current law. Such wastes are therefore thrown away without meaningful disposal precautions, although they are widely believed to create hazards to the environment. Moreover, their disposal results in unnecessary depletion of existing natural mineral resources.

It is therefore desired to provide a viable method for reclaiming various listed and also non-listed hazardous wastes. Such a method must effectively eliminate waste in order to conserve natural resources and avoid costly liability, for example, under the Resource Conservation and Recovery Acts ("RCRA") or Comprehensive Environmental Response, Compensation, and Liability Act ("CERCLA"). Moreover, such a method must be effective to overcome disadvantages associated with prior sodium-based recovery processes. Such disadvantages include high reagent cost, pH imbalances in slags, low value by-products, production of waste, and undesired volatilization of sodium due to the higher temperatures required to reclaim certain metals (i.e., chromium).

In the prior art known to us, numerous methods are taught for recovering various industry wastes for production of useful products. Such products include furnace fuels, paving aggregates, sealing compounds, and mineral wool.

Mineral wool is a term broadly applied to various related products commonly used for insulation, padding, and the like. In general, mineral wool is a fiberglass-like material composed of very fine, interlaced mineral fibers, somewhat similar in appearance to loose wool. Low-temperature wools are composed primarily of silicates of calcium and aluminum. Mineral wool producers commonly use natural rock or slag. Slag is a term broadly applied to refer to waste products of the primary metal and foundry industries, including the erosion of refractory from the furnace lining, charge impurities, ash from fuel, and fluxes used to clean the furnace and remove impurities. Although metal producers and foundries strive to control the amount of slag, excess slag may result from overfluxing.

Slags are classified as either "acid" (or high silicate) slags or "basic" slags, depending upon the relative quantities of acidic and basic subcomponents. For example, typical acid slags contain between forty and fifty percent (40–50%) silica ($SiO_2$), an acidic subcomponent, and relatively small quantities of basic components such as oxides of calcium (CaO) and magnesium (MgO). Aluminum oxide ($Al_2O_3$), which comes from the furnace lining, ranges from ten to twenty percent (10%–20%) and is considered neutral. A typical basic slag, on the other hand, comprises between twenty-six to forty-seven percent (26%–47%) silica ($SiO_2$) and between five and twenty percent (5%–20%) aluminum oxide ($Al_2O_3$) as the acidic subcomponents, and calcium oxide (CaO) ranging between thirty-two and forty-eight percent (32%–48%) and magnesium oxide (MgO) ranging between seven-tenths and twenty percent (0.7%–20%) as the basic subcomponents. Either magnesium oxide or aluminum may come from the erosion of the furnace lining or magnesium may be added to increase the slag basicity.

Basicity is the tool used to determine metal quality produced from a basic slag. Basicity is calculated as follows: (CaO + MgO) ÷ ($Al_2O_3$ + $SiO_2$) Basicity of typical basic slags ranges between 0.93 and 1.9. Generally speaking, metal producers using very high quality metals as charging materials use an acid slag, while metal producers using charge materials which need refining use a basic slag. For best results, mineral wool producers seek slags that can be blended together and melted at relatively low temperatures. Preferably the mineral wool slag will contain no reducible metals, or will be an acid slag, which will eliminate metal buildup in the furnace.

Mineral wool is classified according to the raw materials used in its production. For example, Rock Wool is produced from combinations of natural rocks and/or minerals. Slag Wool comprises a composition of iron, copper, and lead slags typically removed from blast furnaces, and may contain some fluxing materials. Glass Wool is composed principally of silica sand, soda ash, and limestone. Refractory (high-temperature) or "Certa" wool may be made from oxides of aluminum, chromium, zirconium, or titanium and silica sand. Further subclassifications of these products relate to the quality or purity of the wool. For example, slag wool is subclassified for purity according to color; black, gray, and white wools are available. The tool for determining the quality of mineral wool produced from a slag charge is the Acid-to-Base ratio (A:B). The formula for determining A:B is ($Al_2O_3$ + $SiO_2$) ÷ (CaO + MgO). In a typical mineral wool cupola slag, A:B ranges between 0.74 and 2.316.

Prior art patents related to the production of mineral wool using various waste products include Gee U.S. Pat. No. 4,822,388 issued Apr. 18, 1989; and Monaghan U.S. Pat. No. 4,486,211 issued on Dec. 4, 1984. The latter-referenced '211 patent discloses a method and apparatus for melting discarded fly ash and spinning it into mineral wool. However, none of the prior art known to us teaches viable methods for recycling listed hazardous materials such as Chromium, Nickel, Cadmium, Zinc, Copper, Iron, and Lead Oxides or hydroxides into pure metals or alloys while producing mineral wools from Aluminum, Zirconium, and Titanium oxides Other relevant prior art patents known to us relate to methods for treatment, recovery, and recycling. For example, Allen, U.S. Pat. No. 3,870,507, issued Mar. 11, 1975 is directed to a method for forming briquettes from steel mill wastes such as steel and iron dust, mill scale, and iron oxides with an organic binder to reduce slags formed during recycling. The resulting iron oxide briquettes are recycled by being fed into the production furnaces with new materials in the steel-making process. Fukuoka U.S. Pat. No. 4,004,918 issued on Jan. 25, 1977, teaches a method for treating certain wastes resulting from stainless steel operations. Briquettes are formed from the dust and scale from stainless steel ovens combined with organic and inorganic binders. The briquettes are returned to the existing electric arc furnace, and usable metals are extracted for further use in making stainless steel.

Stephens U.S. Pat. No. 4,396,423 issued Aug. 2, 1983 and related U.S. Pat. No. 4,053,301 issued Oct., 1977 relate to a process for recovery of iron carbide and zinc metals from BOF dusts of the steel-making process. The Stephens system reduces the dust wastes within a fluidized bed reactor in the presence of carbon, recovers zinc by vaporization, and produces iron carbide and gangue, a worthless rock or matter in which metals are contained.

U.S. Pat. Nos. 4,758,268 issued Jul. 19, 1988 and 4,836,847 issued Jun. 6, 1989 to Bishop disclose apparatus and processes for reclaiming metals from electric arc furnace and BOF dusts. The systems described therein are directed to providing recovery of metals from EAF wastes in a reducing environment. In the method, carbon is added to the molded briquettes to reduce the iron and zinc content of the waste. However, the process is incapable of producing a slag suitable for use in the production of mineral wool, since these processes attempt to minimize slags to less than 8%. Moreover, the Bishop system is specifically indicated to be unsuited for rotary kilns, shaft furnaces, retorts, and fluidized bed furnaces For purposes of clarity, various terms familiar to those skilled in the art and commonly used in the industry are applied herein and shall be clarified as necessary in context. Various hazardous wastes specifically identified shall be referred to by their standard USEPA designations, as for example, K061 (electric arc furnace dust).

SUMMARY OF THE INVENTION

The present invention is directed to a process for recycling industrial wastes. In the best mode, total recycling is accomplished by reclaiming metals and metal oxides from hazardous industrial wastes and by producing mineral wool from slags. Preferably a plurality of hazardous and non-hazardous wastes are combined to produce valuable products. Of particular advantage is the fact that the present process may be accomplished using various types of industrial equipment already in place.

Among the wastes which may be applied in the instant process are USEPA-listed hazardous wastes of Series D, F, K, P, and U. These wastes are mixed in proper proportions in combination with calcium, pulverized to a predetermined mesh size, and blended with liquids such as waste water to produce a homogeneous mass.

Calcium is essential to the instant recycling process, since the process involves the production of mineral wool as well as recovery of metals. Calcium imparts beneficial qualities to the mineral wool product. While virgin calcium may be used, preferably the source of calcium will be calcium-stabilized wastes, such as metal sludges stabilized with calcium oxide or lime. Calcium lowers the sulfur content, removes phosphorous, and raises pH to facilitate metal reduction. Calcium lowers the eutectic point of the waste mixture, and fluxes metals or alloys as it removes sulfur.

Where the process is carried out using a cupola or shaft furnace, it is necessary to first shape the blended mass into briquettes of predetermined proportions. The briquettes are then cured to reduce the moisture content and improve structural stability. However, if an electric arc furnace, glass furnace, or the like is used, the steps of forming and curing the briquettes are eliminated.

The briquettes are then reduced in the presence of carbon and/or aluminum to separate out reducible metals, volatile metals, and molten slag. In the best mode, reduction will be carried out at temperatures between 1660 and 3100 degrees Fahrenheit in the presence of carbon or aluminum. Reducible metals are drawn off from the slag into molds. Volatile metals are volatilized and reclaimed in the air pollution control system. Non-reducible metals, which are used for the production of mineral wools, remain as oxides in the slag.

Preferably exhaust gases and solid particles produced in the instant process are recycled into the process for further purification for powering the process. Unspun slag particles known as "shot" which remain from the production of mineral wool are also recycled into the system. Various specific examples of numerous possible applications of the present process are provided.

Thus it is a fundamental object of the present invention to provide a viable method for recycling industrial wastes.

Another fundamental object of the present invention is to provide a recycling process which protects and preserves valuable mineral resources.

A similar broad object of the present invention is to provide a method for recovery of metals and metal oxides from hazardous wastes.

Another fundamental object of the present invention is to provide a commercially viable method for recycling hazardous and non-hazardous waste.

A further basic object of the present invention is to provide a method for recycling waste which may be practiced using existing industrial systems and apparatus.

Another basic object of the present invention is to provide a waste recycling method which combines various hazardous and non-hazardous wastes to produce commercially valuable products.

Yet another object of the present invention is to provide a method for recycling hazardous wastes to produce mineral wool.

Still another object of the present invention is to provide a waste recycling method which minimizes industrial waste and itself produces no hazardous by-products.

An additional object of the present invention is to provide a calcium-based hazardous waste recycling method which overcomes problems associated with previous sodium-based stabilization and recovery processes.

A further object of the present invention is to provide a method for recovering valuable metal alloys from metal-bearing hazardous wastes.

Another object of the present invention is to provide a commercially viable waste recycling method which is an effective alternative to treatment and disposal as established by RCRA, CERCLA, and similar environmental protection Acts.

A specific object of the present invention is to provide a method for recovering Chromium, Nickel, Cadmium, Zinc, Iron, Copper and other metals from industrial waste products.

A similar object of the present invention is to provide a method of recovering various alloys from industrial sludge.

A further object of the present invention is to provide a waste recycling method in which titanium, zirconium, aluminum, and chromium oxides are used in the production of mineral wool.

Another object of the present invention is to provide a waste recycling method which permits continued use of preexisting waste treatment systems.

An additional object of the present invention is to provide a recycling method in which various listed and unlisted wastes are combined with calcium and silica to produce valuable products Still another specific object of the present invention is to provide a hazardous waste recycling method in which electric arc furnace dust is combined with calcium and silica products to produce low temperature mineral wool or slags suitable for mineral wool production.

Yet another object of the present invention is to provide a hazardous waste recycling method which may be accomplished in various types of high-temperature furnaces.

These and other objects and advantages of the present invention, along with features of novelty appurtenant thereto, will appear or become apparent in the course of the following descriptive sections.

BRIEF DESCRIPTION OF THE DRAWING

The enclosed drawing, which forms a part of the specification and which is to be construed in conjunction therewith, is a block diagram illustrating the steps involved in our new Method of Recycling Hazardous Waste.

DETAILED DESCRIPTION

With reference to the accompanying drawing, our new method of recycling hazardous waste is broadly designated by the reference numeral 10. The method 10 produces valuable products such as pure metals, metal alloys, metal oxides, and mineral wool from various combinations of waste materials, including common hazardous and non-hazardous industrial wastes. Because numerous types of existing waste treatment apparatus may be used, only general reference is made herein to broad classes of functional components which may be effectively used in carrying out the present method 10.

Waste products generally comprising free-standing sludge composed of twenty-five to fifty percent (25-50%) solids and dry dusts such as K061 (electric arc furnace dust) are collected from various sources and stored in storage silos 15. Industrial wastes may be collected from numerous sources for use in the instant method 10. Wastes which may be utilized by the present technology are listed and categorized in Table 1:

TABLE 1

| EPA Designation | EPA-Classified Wastes Definition/Source |
|---|---|
| K004 | Waste water treatment sludge from production of zinc yellow pigments. |
| K005 | Waste water treatment sludge from production of chrome green pigments. |
| K006 | Waste water treatment sludge from production of chrome oxide green pigments. |
| K007 | Waste water treatment sludge from production of iron blue pigments. |
| K008 | Oven residue from the production of chrome oxide green pigments. |
| K045 | Spent carbon from the treatment of wastewater |

TABLE 1-continued

EPA-Classified Wastes

| EPA Designation | Definition/Source |
|---|---|
| | containing explosives. |
| K061 | Emission control dust/sludge from production of steel in electric furnaces. |
| K062 | Spent pickle liquor from steel finishing operations which use Chlorine. |
| K069 | Emission control dust/sludge from secondary lead smelting. |
| K088 | Spent aluminum potliner. |
| P021 | Calcium cyanide |
| P029 | Copper cyanide |
| P030 | Cyanides (soluble cyanide salts), not otherwise classified. |
| P074 | Nickel cyanide |
| P104 | Silver cyanide |
| P106 | Sodium cyanide |
| P121 | Zinc cyanide |
| P122 | Zinc phosphide, if greater than ten percent. |
| U032 | Calcium Chromate |
| U249 | Zinc phosphide (concentrations less than 10%) |
| D006 | Cadmium, if greater than 1 mg/L total leachate |
| D007 | Chromium, if greater than 5 mg/L total leachate |
| D008 | Lead, if greater than 5 mg/L total leachate |
| D011 | Silver, if greater than 5 mg/L total leachate |
| F006 | Wastewater treatment sludges from electroplating |
| F007 | Spent cyanide plating bath solutions from electroplating operations |
| F008 | Plating bath residues from the bottom of plating baths from electroplating cyanides |
| F009 | Spent stripping and cleaning bath solutions from electroplating cyanides |
| F010 | Quenching bath sludge from oil baths from metal heat-treating operations using cyanides |
| F011 | Spent cyanide solutions from salt bath pot cleaning from metal heat-treating operations |
| F012 | Quenching wastewater treatment sludges from metal heat-treating operations using cyanides |
| F019 | Wastewater treatment sludges from the chemical conversion coating of aluminum |
| F024 | Wastes, not limited to, distillation residues, heavy ends, tars, and reactor clean-out wastes from chlorinated aliphatic hydrocarbons, having carbon content from one to five, utilizing free-radical catalyzed processes |

Other wastes which may be used in the process include sand from casting or blasting operations, carbon from baghouse dusts, coal and coke fines, K088, and slags. Calcium-stabilized wastes which may contain a variety of ingredients, including both reducible and nonreducible metals, metal oxides, hydroxides and/or organics are also useful in the process. Typical compositions of such calcium-stabilized wastes are listed in Table 2:

TABLE 2

Calcium-Stabilized Wastes

| Ingredient | Percent of Material |
|---|---|
| CaO | 41.2 |
| Ignition Loss | 32.7 |
| $Al_2O_3$ | 1.7 |
| $Si_2O$ | 13.1 |
| $Fe_2O_3$ | 4.47 |
| Total Solids | 69.24 |
| Organics | 4.61 |
| As | 0.000792 |
| Cd | 0.00171 |
| Cu | 0.0549 |
| Hg | 0.000207 |
| Ag | 0.000298 |
| Ba | 0.567 |
| Cr | 0.275 |
| Pb | 0.0514 |
| Ni | 0.0225 |

TABLE 2-continued

Calcium-Stabilized Wastes

| Ingredient | Percent of Material |
|---|---|
| Zn | 0.197 |

With reference directed to the drawing, predetermined amounts of selected wastes are delivered from selective silos such as silos 18, 20, 22, 24, 28, and 30 via a conveyor 33 to a pulverizer 36. The wastes are combined and ground in pulverizer 36 to a mesh size typically three hundred (300) or smaller. The pulverized wastes pass via conduit 38 from pulverizer 36 into a brick-making machine 40. Predetermined amounts of liquids stored in suitable tanks 45, 47, 49 preferably including water and certain metal-bearing liquids such as K062, F007, F009, or water-soluble oils are delivered via pipe 53 into the brick-making machine 40 and there mixed with the pulverized wastes until a homogeneous, semi-solid mass is achieved.

Brick-making machine 40 extrudes or otherwise forms the blended, semi-solid mass into briquettes of a predetermined size suitable for the selected melting apparatus. The briquettes thus formed are conveyed from the brick-making machine 40 via line 60 into a curing station 66. Curing station 66 is preferably operated at a temperature of roughly two hundred degrees Fahrenheit, and the briquettes are preferably cured for a period of twenty-four hours. The cured briquettes comprise a substantially hardened block of thoroughly blended waste materials.

Cured briquettes are transferred from curing station 66 by skip cart or conveyor 71. Coke or similar fuel retained in storage bin 76 is conveyed together with the cured bricks to a cupola 80 or similar furnace. It will be appreciated that the best mode described is directed to the use of a cupola 80 or shaft furnace, which requires that briquettes be used. However, the process may also employ other types of furnaces, such as electric arc or glass furnaces. Where the latter-mentioned furnaces are employed, it is not necessary to form briquettes prior to melting. Thus, the brick-making and curing steps may be omitted.

The cupola 80 thus charged with the fuel and briquettes is heated to a temperature of between 1,660° F.-3,100° F. In the best mode, temperatures between 2750° F. and 2800° F. are preferred. When heating takes place in the presence of carbon or aluminum, a reducing atmosphere is provided in cupola 80. In the selected temperature range, a reaction occurs between the various metal oxides of the wastes and the carbon which results in the production of carbon monoxide and metals which are reduced to their metallic states. With the addition of proper additives as described in the following examples, reducible metals may be reclaimed as pure metals or alloys, and volatile metals may be reclaimed as concentrated oxides.

During heating, the briquettes are melted and may be subsequently separated into various component products. Such products include reducible metals; volatile metals; non-reducibles such as certain metal oxides, silica, and calcium; and, exhaust products.

Reducible metals such as copper, chromium, iron, and nickel or alloys may be drawn off the molten mixture in a cupola 80 via the lower tap 84, which is preferably coupled to a mold 92. In the mold 92, the reducible metals are shaped into selective usable dimensions and cooled. The molded metals may be transferred via route 94 after cooling to suitable storage 95 for sale.

Based on our experimentation, substantial purity is obtained in the recovered reducible metals. For example, treated sludges containing oxides or hydroxides of nickel and iron only will reduce virtually quantitatively to a ferro-nickel alloy. Copper-rich sludges may be reduced to copper metal of ninety-nine percent (99%) purity. From oxide mixtures containing iron, nickel, and chromium, 99% of iron, 98% of nickel, and approximately 85% of chromium may be recovered as an alloy.

After the reducible metals are separated out and removed from the molten mixture, a molten slag remains. The slag is devoid of volatile metals such as cadmium and zinc, and various metal oxides such as oxides of aluminum, chromium, titanium, silicon, zirconium, and calcium remain. The latter metal oxides, which are essential for the production of mineral wool, are drawn off via the upper tap 99 of cupola 80. From tap 99 the metal oxides may be blown or spun into mineral wool at production station 103. The mineral wool produced at station 103 is fed into collection bins 107, and subsequently separated and packaged for sale in a bagging machine 114. After bagging, the mineral wool is moved 115 to storage 118 for sale. The shot, comprising unspun particles of slag, is recycled 105 from station 103 into the recycling station 140. As indicated in the following examples, shot generally comprises one-third of each mineral wool cycle.

The volatile metals are volatilized in the presence of Carbon. Carbon or carbon monoxide removes the oxygen from the oxides of cadmium and zinc in the same manner as it does with the reducible metals. Cadmium and zinc thus reduced to their metallic states are volatilized at a selected lower temperature. Volatile metals and other exhaust products are directed out of cupola 80 via exhaust ports 125.

Port 125 feeds into a heavy solids separator 133. A fine water mist injected into the separator 133 separates out particles of a size larger than one micron (1 $\mu$) from the exhaust products. These particles are delivered into recycling station 140 via conveyor 134 back into the pulverizer 36 and are recombined with other waste mixtures from silos 15 for further processing in accordance with the present method.

Solid particles smaller than 1 micron and exhaust gases remaining after processing in separator 133 are passed into an afterburner 146. In afterburner 146, these particles and gases which include carbon and carbon monoxide and/or other combustibles are mixed with air and natural gas and ignited. Ignition converts the excess carbon monoxide into an energy source for use by the system.

Hot burning gases pass into a waste heat boiler 151, which produces steam. As indicated by broken lines 155, the steam is piped out of boiler 151 and used to power the briquette dryer 66 and the mineral wool production station 103. The cooled exhaust gases are directed via pipe 163 into a heat exchanger 167. The gases release heat which is used to heat outside air fed into exchanger 167 via blower 174. As indicated by dashed line 177, the preheated air warmed by the exhaust gases are piped into the tuyeres of cupola 80. Cooler gases are subsequently directed via duct 183 into a baghouse 189.

In baghouse 189, the reduced-temperature gases are treated to separate solids from exhaust gases. The solids generally comprising marketable oxides from the volatilized zinc, cadmium, and lead are moved as indicated at 190 to storage 118. The exhaust gases, now purified of offensive or hazardous components, are drawn upwardly by a fan 194 through stack 198 and exhausted into the environment. The present method thus provides complete recycling of waste products to produce marketable substances with minimal resulting waste. Complete reclamation of hazardous and/or valuable substances by the present process permits industry to minimize waste, fully exploit its available resources, and expand its markets.

The present process is well-adapted to use with numerous types and blends of waste products. Various examples of successful applications of the process are provided hereinafter. However, it will be appreciated that such examples are provided only as representative of the best mode and are not intended to limit the scope of the present application.

Organic binders containing cyanide were used to stabilize and harden the bricks used in various tests. Cyanide aids in the metal-reduction process. Importantly, no cyanide was detected in the slag or the metals after processing. Any cyanides present in the air stream in the form of hydrogen cyanide are destroyed in the afterburner of the boiler and are not emitted.

As illustrated by the following examples, the present process represents an important advance in the art of waste recycling. However, it will be appreciated that the system 10 may find many applications, and the following examples are provided merely as illustrative, and are not to be construed to limit the scope of the invention.

EXAMPLE I

RECOVERY OF ZINC AND IRON AND PRODUCTION OF MINERAL WOOL

The waste materials listed in Table 3 below are mixed into a homogeneous mass and molded into small briquettes. The briquettes are dried to a final moisture content of five percent, and subsequently reduced in a shaft furnace at 1800 degrees Fahrenheit using coke as fuel at a 1:1 charge to fuel ratio.

TABLE 3

| Waste Materials Used in Sample | | |
|---|---|---|
| EPA Designation | *Components | Percent of Total |
| K061 | | 63.1% |
| | CaO | 25% |
| | $Fe_2O_3$ as Fe | 24% |
| | ZnO as Zn | 22% |
| | $SiO_2$ | 3% |
| | MgO | 3% |
| | PbO as Pb | 1% |
| | $Cr_2O_3$ as Cr | 0.07% |
| | CdO as Cd | 0.065% |
| K062 (stabilized secure land fill material) | | 19.42% |
| | CaO | 41.2% |
| | $SiO_2$ | 13.1% |
| | Organics | 4.61% |
| | $Fe_2O_3$ as Fe | 4.47% |
| | $Al_2O_3$ as Al | 1.7% |
| | Zn | 0.0197% |
| | Ba | 0.00567% |
| | Cu | 0.00549% |
| | Pb | 0.00514% |
| | Cr | 0.00375% |
| | Ni | 0.00225% |
| | As | 0.000792% |
| | Hg | 0.000201% |
| | Cd | 0.000171% |
| F019 | | 9.71% |

TABLE 3-continued

| Waste Materials Used in Sample | | |
|---|---|---|
| EPA Designation | *Components | Percent of Total |
| | Al(OH)$_2$ | 74% |
| | Ca(OH)$_2$ | 15% |
| | Mg(OH)$_2$ | 10.4% |
| New Silica Sand | | 7.77% |
| | SiO$_2$ | 98% |

*Components are given by dry weight as measured at 101-Degrees Centigrade.

A typical sample of products resulting from one ton of dried briquettes passing through one cycle of the present process is shown in the following Table 4.

TABLE 4

| | Yield from One Ton Sample | |
|---|---|---|
| PRODUCT | SUBCOMPONENTS | POUNDS |
| Primary Alloy | | 315.67 |
| | Fe | 314.45 |
| | Cr | 0.63 |
| | S | 0.56 |
| | Cu | 0.02 |
| | Ni | 0.01 |
| Volatile Metals | | 250.84 |
| | Zn | 249.94 |
| | Pb | 0.78 |
| | Cd | 0.12 |
| Secondary Alloy | Pb | 12.32 |
| Slag (OXides) | | 1,116.92 |
| | Ca | 504.65 |
| | Si | 356.28 |
| | Al | 152.16 |
| | Mg | 57.55 |
| | Fe | 16.77 |
| | S | 12.11 |
| | F | 9.84 |
| | Na | 6.15 |
| | Chlorides | 0.80 |
| | Pb | 0.32 |
| | Cr | 0.27 |
| Mineral Wool from Slag | | 838 |
| | Shot | 279 |

The resulting Acid:Base ratio in Example I is 0.92. Basicity is 1.11. All exhausts, heavy solids, and shot are recycled into the system, and no wastes result. Lead present as a secondary alloy readily separates from the iron in the molds and after cooling.

EXAMPLE II

RECOVERY OF IRON AND ZINC AND PRODUCTION OF MINERAL WOOL

The wastes listed in Table 5 below are mixed into a homogeneous mass and molded into small briquettes. The briquettes are cured and subsequently reduced in a shaft furnace at 2900 degrees Fahrenheit. In this sample, fuel consumption is reduced by roughly one-half, due to the presence of aluminum in the waste. The aluminum contained in the casting sands and the sludge from the grinding and buffing operations helps to reduce the iron while increasing the slag temperature and volatilizing the zinc.

TABLE 5

| Waste Materials Used in Sample | | |
|---|---|---|
| EPA Designation | *Components | Percent of Total |
| K061 | | 70% |
| | CaO | 25% |
| | Fe$_2$O$_3$ as Fe | 24% |
| | ZnO as Zn | 22% |
| | SiO$_2$ | 3% |
| | MgO | 3% |
| | PbO as Pb | 1% |

TABLE 5-continued

| Waste Materials Used in Sample | | |
|---|---|---|
| EPA Designation | *Components | Percent of Total |
| | Cr$_2$O$_3$ as Cr | 0.07% |
| | CdO as Cd | 0.065% |
| MOLDING SAND | | 10% |
| | SiO$_2$ | 93% |
| | Organic Binders | 3% |
| | Al$_2$O$_3$ | 2% |
| | Al | 1.66% |
| GRINDING BUFFING SLUDGE | | 20% |
| | Al | 41% |
| | Fibers | 33% |
| | SiO$_2$ | 20% |

*Components are given by dry weight as measured at 100-Degrees Centigrade.

Products obtained from a representative one-ton sample of dried briquettes processed in Example II are set forth in the following Table 6.

TABLE 6

| | Yield from One-Ton Sample | |
|---|---|---|
| PRODUCT | SUBCOMPONENTS | POUNDS |
| Primary Alloy | | 336.86 |
| | Fe | 336.0 |
| | Cr | 0.86 |
| Volatile Metals | | 278.14 |
| | Zn | 277.2 |
| | Cd | 0.86 |
| | Pb | 0.08 |
| Secondary Alloy | Pb | 13.65 |
| Slag (Oxides) | | 948.61 |
| | Si | 361.73 |
| | Ca | 350.00 |
| | Al | 143.91 |
| | Mg | 42.0 |
| | Fe | 17.92 |
| | F | 10.92 |
| | S | 8.09 |
| | Na | 6.83 |
| | Inerts | 5.85 |
| | Chloride | 0.89 |
| | Pb | 0.35 |
| | Cr | 0.12 |
| Mineral Wool from Slag | | 711 |
| | Shot | 237 |

The Acid:Base Ratio of Example II is 1:33; basicity is 0.78. As in the first example, lead is present as a secondary alloy which readily separates from the iron in the molds and after cooling. Exhausts, heavy solids, and shot are recycled and no wastes result.

EXAMPLE III

RECOVERY OF CHROME, ZINC, NICKEL, AND IRON ALLOY AND PRODUCTION OF MINERAL WOOL

The wastes listed in Table 7 below are mixed into a homogeneous mass and formed into briquettes. The briquettes are then cured to a final moisture content of five percent. The briquettes are reduced in a shaft furnace at 3100 degrees Fahrenheit using coke at a 2:1 charge-to-fuel ratio.

TABLE 7

| Waste Materials Used in Sample | | |
|---|---|---|
| EPA Designation | *Components | Percent of Total |
| K061 | | 40% |
| | CaO | 25% |
| | Fe$_2$O$_3$ as Fe | 24% |
| | ZnO as Zn | 22% |
| | SiO$_2$ | 3% |
| | MgO | 3% |

TABLE 7-continued

| Waste Materials Used in Sample | | |
|---|---|---|
| EPA Designation | *Components | Percent of Total |
| | PbO as Pb | 1% |
| | Cr$_2$O$_3$ as Cr | 0.07% |
| | CdO as Cd | 0.065% |
| F006 | | 31% |
| | Cr | 24.662% |
| | Ni | 15.559% |
| | Organics | 9% |
| | Fe | 8.44% |
| | CaO | 1.88% |
| | Zn | 1.193% |
| | Cu | 0.71% |
| | Mg | 0.6% |
| | Pb | 0.0272% |
| F019 | | 6% |
| | Al(OH)$_2$ | 74% |
| | Ca(OH)$_2$ | 15% |
| | Mg(OH)$_2$ | 10.4% |
| K062 (stabilized secure land fill material) | | 14% |
| | CaO | 41.2% |
| | SiO$_2$ | 13.1% |
| | Organics | 4.61% |
| | Fe$_2$O$_3$ as Fe | 4.47% |
| | Al$_2$O$_3$ as Al | 1.7% |
| | Zn | 0.0197% |
| | Ni | 0.00225% |
| | Ba | 0.00567% |
| | As | 0.000792% |
| | Cu | 0.00549% |
| | Hg | 0.000201% |
| | Pb | 0.00514% |
| | Cd | 0.000171% |
| | Cr | 0.00375% |

*Components are given on a dry weight basis as detected at 101-degrees Centigrade.

Products obtained in a representative sample of the process of Example III are listed in Table 8 below:

TABLE 8

| Yield from One-Ton Sample | | |
|---|---|---|
| PRODUCT | SUBCOMPONENTS | POUNDS |
| Primary Alloy | | 458.19 |
| | Fe | 252.67 |
| | Cr | 107.26 |
| | Ni | 94.06 |
| | Cu | 4.2 |
| Volatile Metals | | 165.616 |
| | Zn | 165.11 |
| | Cd | 0.50 |
| | Pb | 0.006 |
| Secondary Alloy | Pb | 7.98 |
| Slag (Oxides | | 847.68 |
| | Ca | 345.02 |
| | Si | 290.82 |
| | Al | 94.73 |
| | Cr | 45.97 |
| | Mg | 39.89 |
| | Fe | 13.48 |
| | S | 6.92 |
| | F | 6.24 |
| | Na | 3.9 |
| | Cl | 0.51 |
| | Pb | 0.20 |
| Mineral Wool from Slag | | 636 |
| | Shot | 211 |

The resulting Acid:Base ratio is 0.92. Basicity is 1.11. Exhausts, heavy solids, and shot are recycled into the system, and no wastes result.

EXAMPLE IV

RECOVERY OF CU AND PRODUCTION OF MINERAL WOOL

The waste materials listed in Table 9 below are mixed and molded into briquettes. The briquettes are cured to a final moisture content of six percent, and reduced at 2200 degrees Fahrenheit in a shaft furnace using coke at a 6:1 charge-to-fuel ratio.

TABLE 9

| Waste Materials Used in Sample | | |
|---|---|---|
| EPA Designation | *Components | Percent of Total |
| F006 | | 60% |
| | Cu | 30.01% |
| | CaO | 23.0% |
| | Zn | 4.2% |
| | Cr | 0.0036% |
| | Ni | 0.0036% |
| | Ba | 0.0008% |
| | As | 0.006% |
| MOLDING SAND | | 10% |
| | SiO$_2$ | 93% |
| | Organic Binders | 3% |
| | Al$_2$O$_3$ | 2% |
| | Al | 1.66% |
| AIR EMISSION DUST | | 20% |
| | C | 50% |
| | CaO | 21% |
| | Al$_2$O$_3$ | 10% |
| | SiO$_2$ | 6% |
| | MgO | 3.1% |
| | Fluorides | 0.3% |
| GRINDING BUFFING SLUDGE | | 10% |
| | Al | 41% |
| | Fibers (carbonized) | 33% |
| | SiO$_2$ | 20% |

*Components are given on a dry weight basis as detected at 101-degrees Centigrade.

Table 10 below lists products obtained in a representative sample resulting from materials processed in Example IV:

TABLE 10

| Yield from One-Ton Sample | | |
|---|---|---|
| PRODUCT | SUBCOMPONENTS | POUNDS |
| Primary Alloy | | 342.08 |
| | Cu | 342.0 |
| | Ni | 0.04 |
| | Cr | 0.03 |
| | As | 0.01 |
| Volatile Metals | Zn | 45.36 |
| Secondary Alloy | | None |
| Slags from Oxides | | 790.25 |
| | Ca | 360.00 |
| | Si | 274.46 |
| | Al | 114.17 |
| | Inerts | 25.35 |
| | Mg | 12.40 |
| | S | 2.68 |
| | F | 1.17 |
| | Ba | 0.01 |
| | Cr | 0.01 |
| Mineral Wool from Slag | | 592 |
| | Shot | 197 |

The resulting Acid:Base ratio is 1.11. Basicity is 0.96. Exhausts, heavy solids, and shot are recycled into the system, and no wastes result.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A process for recycling hazardous and non-hazardous wastes containing residues of iron, chromium, copper, nickel and/or zinc, the process comprising the steps of:
   a) collecting wastes comprising said residues of iron, chromium, copper, nickel and/or zinc from the group consisting of:
      i) emission control dust and sludge from production of steel in electric furnaces;
      ii) wastewater treatment sludges from electroplating;
      iii) wastewater treatment sludges from the chemical conversion coating of aluminum; and,
      iv) spent pickle liquor from steel finishing operations which use Chlorine;
   b) blending the wastes of step (a) with at least one liquid into a homogeneous mass;
   c) forming the mass of step (b) into briquettes;
   d) curing said briquettes to a moisture content of about five percent;
   e) charging a furnace with the briquettes of step (d) and coke in a 2:1 charge to fuel ratio;
   f) heating the briquettes of step (e) in said furnace to approximately about 3100 degrees Fahrenheit to reduce the iron, chromium, copper, and nickel of said wastes of step (a) to a metallic state, and to reduce the zinc of said wastes of step (a) to a volatile state, and to produce slag and exhausts comprising gas and particles;
   g) drawing off the metallic iron, chromium, copper, and nickel of step (f) as an alloy;
   h) drawing off the slag of step (f) and forming said slag into mineral wool and shot and returning said shot to step (a);
   i) collecting the zinc of step (f);
   j) separating the exhausts of step (f) into said gas, particles sized less than one micron and particles larger than one micron, and returning particles larger than one micron to said step (a);
   k) mixing the gases and particles smaller than one micron of step (j) with air, carbon dust, carbon monoxide, and natural gas to form a mixture, and then burning the mixture in an afterburner; and
   l) cooling the burnt mixture of step (k) and separating it into recoverable solids and nonhazardous gaseous wastes.

2. The process as defined in claim 1 wherein at least one of the liquids of step (b) is an organic binder containing cyanide.

3. The process as defined in claim 2 wherein hydrogen cyanide is formed from said briquettes during step (c), and said method comprises the step of recycling said hydrogen cyanide to said step (k) for destruction.

4. The process as defined in claim 3 comprising the further step of partially operating a boiler using heat produced by step (k).

* * * * *